United States Patent Office.

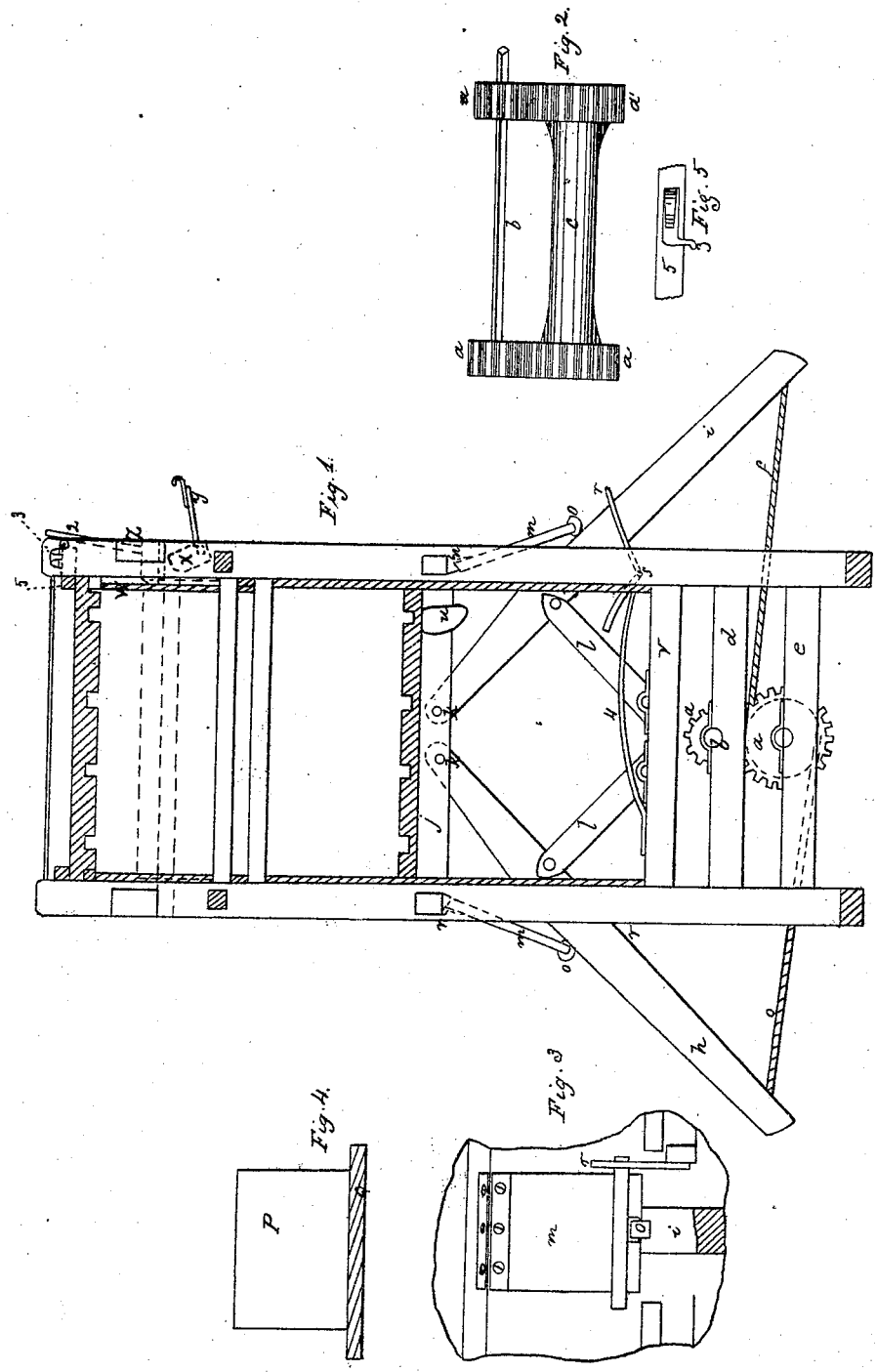

GEORGE NOYES, OF POWNAL, MAINE, ASSIGNOR TO ANDREW LEIGHTON AND M. L. WHITNEY.

Letters Patent No. 72,221, dated December 17, 1867.

---

IMPROVED HAY-PRESS.

---

The Schedule referred to in these Letters Patent and making part of the same.

---

TO ALL WHOM IT MAY CONCERN:

Be it known that I, GEORGE NOYES, of Pownal, in the county of Cumberland, and State of Maine, have invented a new and useful Improved Hay-Press; and I hereby declare the following to be a full, clear, and exact description thereof, which will enable others to make and use my invention, reference being had to the accompanying drawings, forming part of this specification, in which—

Figure 1 is a side sectional elevation of my invention.
Figure 2 is a side view of the motive and winding-shafts.
Figure 3 is a face view of one of the adjustable traps or doors.
Figure 4 is an end view of the old form of follower, used to close the spaces in my invention occupied by the doors.
Figure 5, a top view of the lever to hold the compressing-clamps.

Hay-presses, as at present constructed, employ, in one or another form, two expanding and contracting arms, to compress the hay when placed and trodden in the body of the press. Such I do not claim. The shaft upon which the cords which move the arms are wound is also common. But I am not aware of any machine employing the double gears $a$ $a'$, that is, one at each end of the two shafts $b$ $c$. This imparts an evenness and regularity to the motion where so much force is exerted as in these machines, and much improves the durability of the operating parts, and is also stronger. These shafts and gears are distinctly seen in the drawing, the shafts resting on the two cross-beams $d$ $e$. Around the shaft or drum $c$ are wound the cords $f$ $g$, attached to the arms or levers $h$ $i$. These arms $h$ $i$ are attached by joints to the platform $j$ at $k$. They are furthermore supported and strengthened by the braces $l$. Thus, when the platform is raised, the two arms $h$ $i$ approach each other, and when the platform is lowered, they expand. Power is applied at $c$. $m$ $m'$ represent two traps or doors on the sides of the press, having hinges $n$ and trucks $o$. These spaces in the sides of the press, occupied by the expanding and contracting arms $h$ $i$, are necessarily left to allow of the motion of these arms. Heretofore such spaces have been filled, when the platform is lowered, by the lips or flanges $p$, fig. 4, on the false bottom or follower $q$. But this was found inconvenient, particularly when a bale of hay burst and had to be taken out, as the wings $p$, being of metal, caught the bale or bundle, and rendered the manipulation difficult. In my invention I dispense with this fig. 4, and substitute the doors or traps $m$.

To insure the operation of these doors, I employ certain other devices. In fig. 1, at $r$ $r'$, are two bent levers on pivots $s$, one only visible in the side view. $t$ is a spring to throw this lever down, as illustrated in the drawing. When these levers are thus thrown out, the doors $m$ $m'$ are easily opened by the expanding levers $h$ $i$. $u$ shows an ear or projection on the platform $j$. When the platform $j$ is brought down so as to nearly touch the cross-beam $v$, this ear $u$ presses down the inner arm of the bent lever $r$, and the spring 4 with it, and brings the outer arm of this lever $r$ against the exterior of the door $m$ or $m'$, thus securely closing it, and so allowing the hay to be trodden, as is customary, when first placed in the press. When the arms $h$ $i$ are fully expanded, or when the platform $j$ is brought to its lowest position, the levers $h$ $i$ drop out of the spaces filled by the doors $m$, and then the ears $u$ press on the bent levers $r$ $r'$, and press those levers against the doors. Then, when in the operation of the machine the platform $j$ rises, the springs are released from the pressure of the ears $u$, and the doors allowed to be opened by the arms $h$ $i$. The door, held in a closed position, is illustrated in fig. 3.

When the platform is pressed up by the arms $h$ $i$, and the hay pressed in a vertical direction, it is necessary to bring upon the bale a pressure on its ends. This I accomplish by means of the movable end piece $w$. $x$ $z$ show two cams or eccentrics moved by arms $y$ 2, the arm $y$ locking into 2, and held by the hooked lever 3. By turning $y$ in a vertical position, after hooking it into 2, the movable side piece $w$ is driven inward on to the hay. The lever 3 heretofore, when employed to hook into and hold the lever 2, has turned inwardly, and was thus liable to be struck by the foot of the operator, and was, moreover, otherwise in the way. By turning outward when hooking into 2, it rests on the top of the cross-beam 5, and is thus out of the way of the operator.

My machine is embraced in a rectangular frame, as usual, and presses the hay by moving the platform upward. It will be understood that there are two ears, u, and two springs and levers, 4 r, one on each of two opposite sides of the machine.

The above-described press is intended to be portable, and it will be seen that when the two arms h i are brought to their nearly vertical position, the rectangular box or frame can be easily carried from place to place.

What I claim as my invention, and desire to secure by Letters Patent, is—

1. The combination of the springs 4 and levers r, as and for the specified purposes.
2. The combination of the ears u, springs 4, and levers r, as and for the specified purposes.
3. The adjustable doors m, with trucks o, as and for the purposes described.
4. The combination of the clamps or cams x z, levers y and 2, and lever 3, all as and for the purposes described.

GEO. NOYES.

Witnesses:
W. H. CLIFFORD,
HENRY C. HOUSTON.